United States Patent [19]

Forget

[11] Patent Number: 5,292,179

[45] Date of Patent: Mar. 8, 1994

[54] SAFETY ROTARY BASE ENABLING A ROTATION OVER 180 DEGREES OF SEAT IN AN AUTOMOBILE VEHICLE OR THE LIKE

[75] Inventor: Dominique A. Forget, Orne, France

[73] Assignee: Bertrand Faure Automobile "BFA", Essone, France

[21] Appl. No.: 988,901

[22] Filed: Dec. 8, 1992

[30] Foreign Application Priority Data

Dec. 10, 1991 [FR] France .................. 91 15288

[51] Int. Cl.⁵ ............................. B60N 2/02
[52] U.S. Cl. .................. 297/344.24; 296/65.1; 248/425
[58] Field of Search .......... 248/416, 425; 297/344, 297/349; 296/65.1

[56] References Cited

U.S. PATENT DOCUMENTS

| | | | |
|---|---|---|---|
| 1,808,659 | 6/1931 | Hultgren | 297/349 X |
| 2,204,218 | 6/1940 | Hill | 297/349 X |
| 3,338,622 | 8/1967 | Bachmann | |
| 3,572,817 | 3/1971 | Colautti | 297/349 X |
| 4,756,502 | 7/1988 | Egan | 297/349 X |
| 4,792,188 | 12/1988 | Kawashima | 297/349 |
| 4,822,099 | 4/1989 | Negi et al. | 297/349 |
| 4,834,452 | 5/1989 | Goodrich | |
| 4,844,543 | 7/1989 | Ochiai | 297/349 |

FOREIGN PATENT DOCUMENTS 7740881 11/1981 Australia .
2676690 11/1992 France .

OTHER PUBLICATIONS

Patent Abstracts of Japan; vol. 8 No. 35; Feb. 15, 1984; 58-191637.

Primary Examiner—Michael F. Trettel
Attorney, Agent, or Firm—Robert W. Becker & Assocaites

[57] ABSTRACT

A fixed plate supporting the vehicle seat is secured to longitudinal adjusting slides. The fixed plate supports a rotary intermediate plate via a first ball bearing and a cover rigidly connected to the fixed plate and supported at the rotary intermediate plate via a second ball bearing. The assembly is centered on the two ball bearings. Displacement of a central rod is controlled by a lever articulated on a pivot rigidly connected to the fixed plate. This lever is forked and cooperates with the head of the rod and a washer separated from the head by a spring mounted concentrically to the rod. The lever actuates, in one direction, two safety latches normally latching the rotary intermediate plate in order to release the seat for a 180° rotation.

2 Claims, 6 Drawing Sheets

SAFETY ROTARY BASE ENABLING A ROTATION OVER 180 DEGREES OF SEAT IN AN AUTOMOBILE VEHICLE OR THE LIKE

FIELD OF THE INVENTION

This invention relates to a safety rotary base enabling a rotation over 180° of a seat in an automobile vehicle or the like.

BACKGROUND OF THE INVENTION

Vehicles with a passenger compartment able to seat six, seven or even eight persons, without these vehicles being considered by international regulations as public transportation vehicles, are now very commonly used.

Thus, there has been an increasing number of vehicles known in the trade under the names of "Minibus", "Espace", "Voyager", etc. In these vehicles three parallel rows of seats are transversely positioned. The back row and the intermediate row both receive three passengers, while the front row consists of two separate front seats, the first one for one passenger, the second one for the driver.

Generally, these vehicles are equipped when used for business, with a telephone and a facsimile unit, and sometimes can even receive television broadcastings on screens placed conveniently beneath the vehicle roof. It is thus possible to prepare or to continue a meeting between, for example, an airport and a meeting place.

Therefore, there has been a need to provide measures for rotating 180° the front passenger seat and the intermediate seats, so as to be able to organize a working session between six or seven persons.

Such vehicles can also be used as family vehicles, and it is sometimes desirable for a mother to be able to talk comfortably with her children and the persons accompanying them, so as to make a long trip more enjoyable.

Until now, the pivoting seat or seats have been mounted on simple rotary bases. These rotary bases have not been provided with safety devices, so that they can pivot independently of the position of the respective seat, resulting in difficulties during rotation of the seat. Actually, the respective seat to be rotated could abut against other seats or other parts of the vehicle passenger compartment.

It is an object of the present invention to provide a rotary base allowing the rotation of a seat only when the seat is in a particular position in which the unlatching of a mechanism that ensures the locking of the rotary base is possible.

SUMMARY OF THE INVENTION

According to the invention, the safety rotary base enabling a 180° rotation of a seat in an automobile vehicle or the like has a fixed plate supporting the seat secured to longitudinal adjusting slides for the seat. This fixed plate supports, on the one hand, a rotary intermediate plate via a first ball bearing and, on the other hand, a cover rigidly connected to the fixed plate and supported at the rotary intermediate plate by a second ball bearing, thereby forming an assembly, that is centered on the two ball bearings. A displacement of a rod is controlled by a lever articulated on a pivot rigidly connected to the fixed plate. The lever is forked and cooperats, on the one hand, with the head of the rod and, on the other hand, with a washer separated from the head by a spring mounted concentrically to the rod. The lever actuates, in one direction, two safety latches normally latching the rotary intermediate plate in order to release the seat for a 180° rotation, but only when the seat is in a forward position (pushed toward the front of the vehicle) after unlatching the adjusting slides via a conventional sliding latch that is subjected to a reverse action of the lever acting on arms. A rearward movement of another latching mechanism of the rotary intermediate plate is ensured by tilting the back portion of the seat toward the sitting portion of the seat.

Various other features of the invention will become more apparent from the following detailed description.

BRIEF DESCRIPTION OF THE DRAWINGS

An embodiment of the invention is shown by way of a non-limiting example in the accompanying drawings, wherein.

DETAILED DESCRIPTION OF A PREFERRED EMBODIMENT

Figure 2:
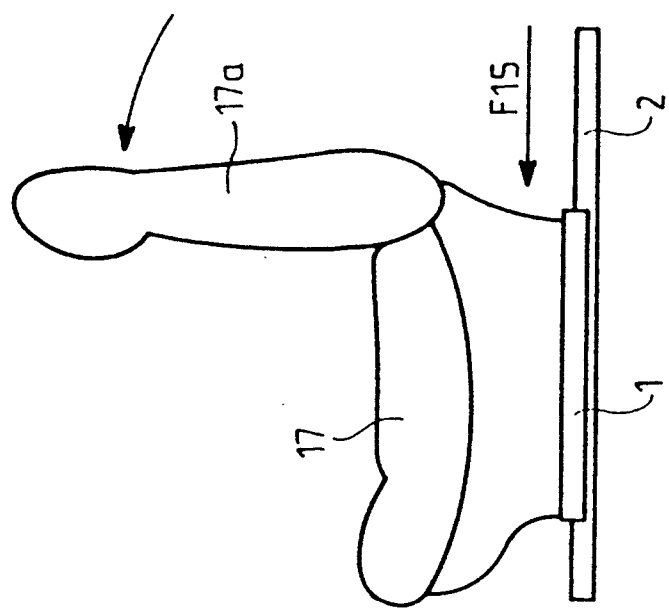
FIG. 2 is a side-elevational view of the seat displaced toward the front of the vehicle, prior to its 180° rotation.
Figure 1:
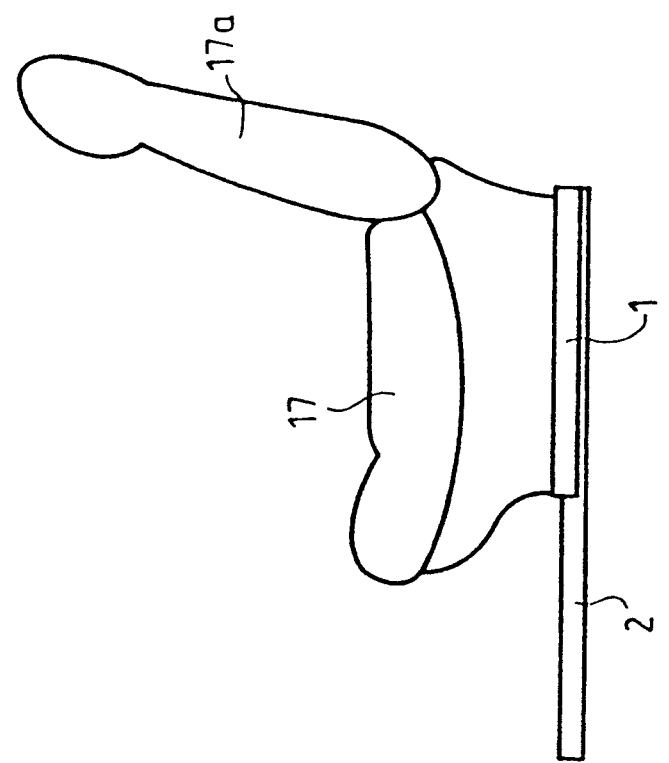
FIG. 1 shows a seat in position of use and oriented in the driving direction of the vehicle.
Figure 6:
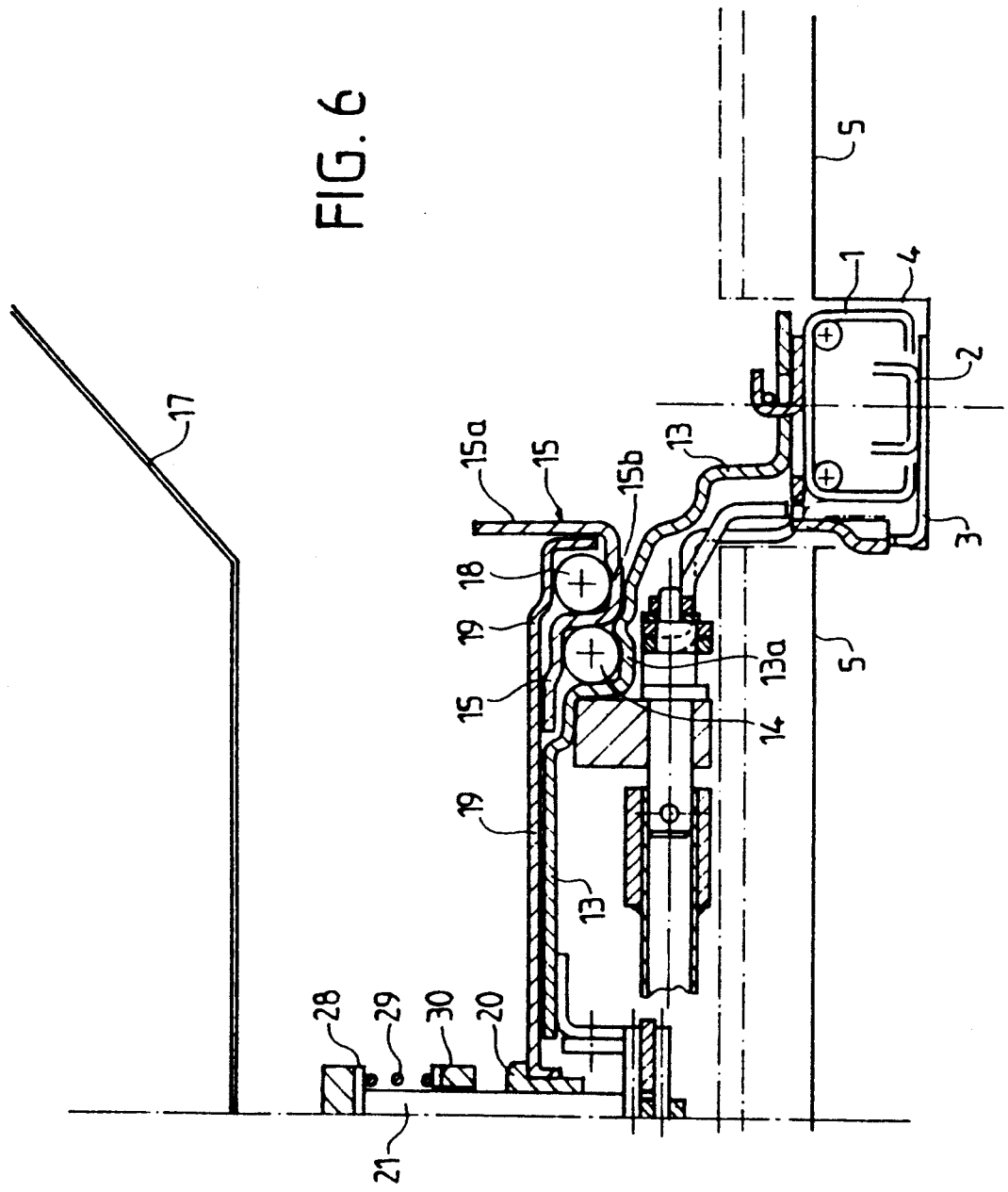
FIG. 6 is a cross-sectional view taken substantially along the line VI—VI of FIG. 7.

Referring now to the drawings, FIGS. 1 and 2 show schematically the top of the upper mobile profiled member 1 of a slide, whose lower fixed profiled member 2, shown in FIG. 6, is supported by an iron fitting or bracket 3.

As is the case for all vehicle seat mountings, the slides are placed longitudinally on either side of the seat, either on the floor board or in longitudinal channels 4 provided in the floor board 5 of the vehicle.

The top of the upper mobile profiled member 1 carries a sliding latch 6 having an inner side with a projection 7 adapted for cooperating with abutment 8 having an opening 8a. Moreover, the sliding latch 6 comprises a recess 9.

The sliding latch 6 is subjected to the action of a leaf spring 10 forcing it in direction of arrow F10 so that the projection 7 is always in contact with the abutment 8 placed parallel to the slide 1, 2.

Figure 7:
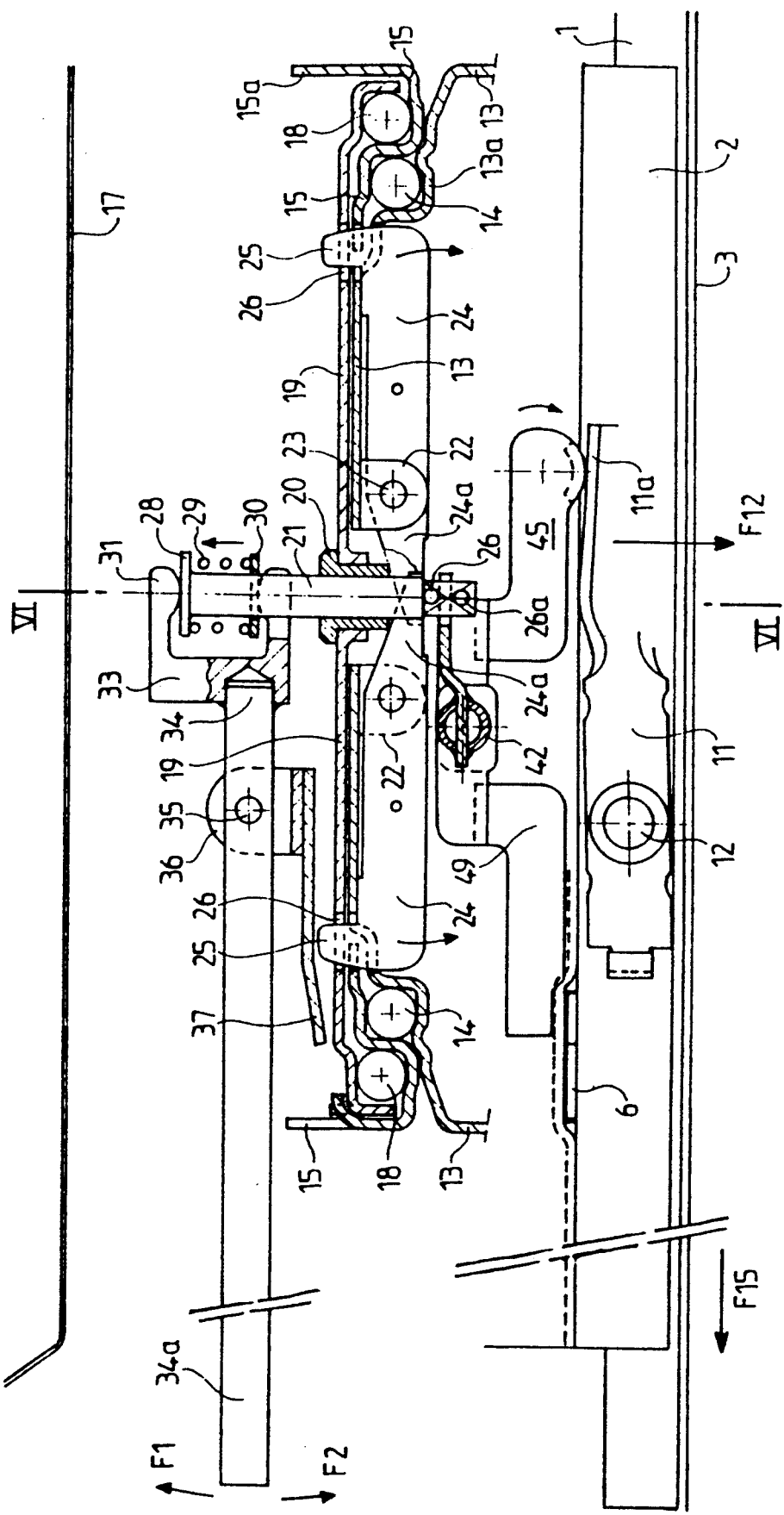
FIG. 7 is a cross-sectional view of the mechanism.

As shown in FIG. 7, the slide 1, 2 comprises a locking mechanism 11 articulated on a pivot 12 in a manner known per se, this locking mechanism 11 having a toothing in engagement with a toothing provided on the lower fixed profiled member 2 of the slide 1, 2 in order to normally fasten the upper mobile profiled member 1 to the lower fixed profiled member 2.

A spring, not shown, acting on one end 11a of the locking mechanism 11, tends to pivot the locking mechanism 11 in a direction reversed to that of arrow F12.

This mounting is not described in more detail since it is conventional.

The top of the upper mobile profiled members 1 supports a fixed plate 13 having a recess 13a for receiving a set of balls 14 covered by a rotary intermediate plate 15 having a rim portion 15a supporting the seat 17 of FIGS. 1 and 2, also shown schematically in FIGS. 6 and 7.

The rotary intermediate plate 15 has a ball race 15b containing a set of balls 18 held in place by a cover 19 so that the rotary intermediate plate 15 is guided horizontally when rotating about itself, as described and shown in French patent application No. 91 06234 of May 23, 1991.

As shown in FIG. 7, the cover 19 is centered on the balls 18 which, in turn, are centered on the rotary intermediate plate 15. The rotary intermediate plate 15 is, in turn, centered by the balls 14 which center themselves on the fixed plate 13. A ring 20 which is attached fixedly to the cover 19 enables a rod 21 to slide.

The fixed plate 13, fixedly attached to the upper member 1 of each slide, comprises lugs 22 for carrying pivots 23 on which are articulated two safety latches 24 ending in vertical fingers 25 that extend through diametrically opposite holes 26, formed in the cover 19 as well as in the rotary intermediate plate 15 and the fixed plate 13.

The end portion 24a of each safety latch 24 bears on a pin 26 fixedly attached to the sliding rod 21. The sliding rod 21 terminates at its upper portion in a head 28. A spring 29 is placed around the sliding rod 21 between the head 28 and a washer 30 and biases downwardly the washer 30.

The head 28 and the washer 30 are placed between legs 31 and 32 of a forked end 33 attached to the end of a rod 34 forming a lever articulated on a pivot 35. The front portion 34a of the rod 34 is normally provided with a control handle (not shown).

The pivot 35 has a support 36 rigidly connected to a support plate 37 which is fixedly connected with the fixed plate 13.

Figure 3:
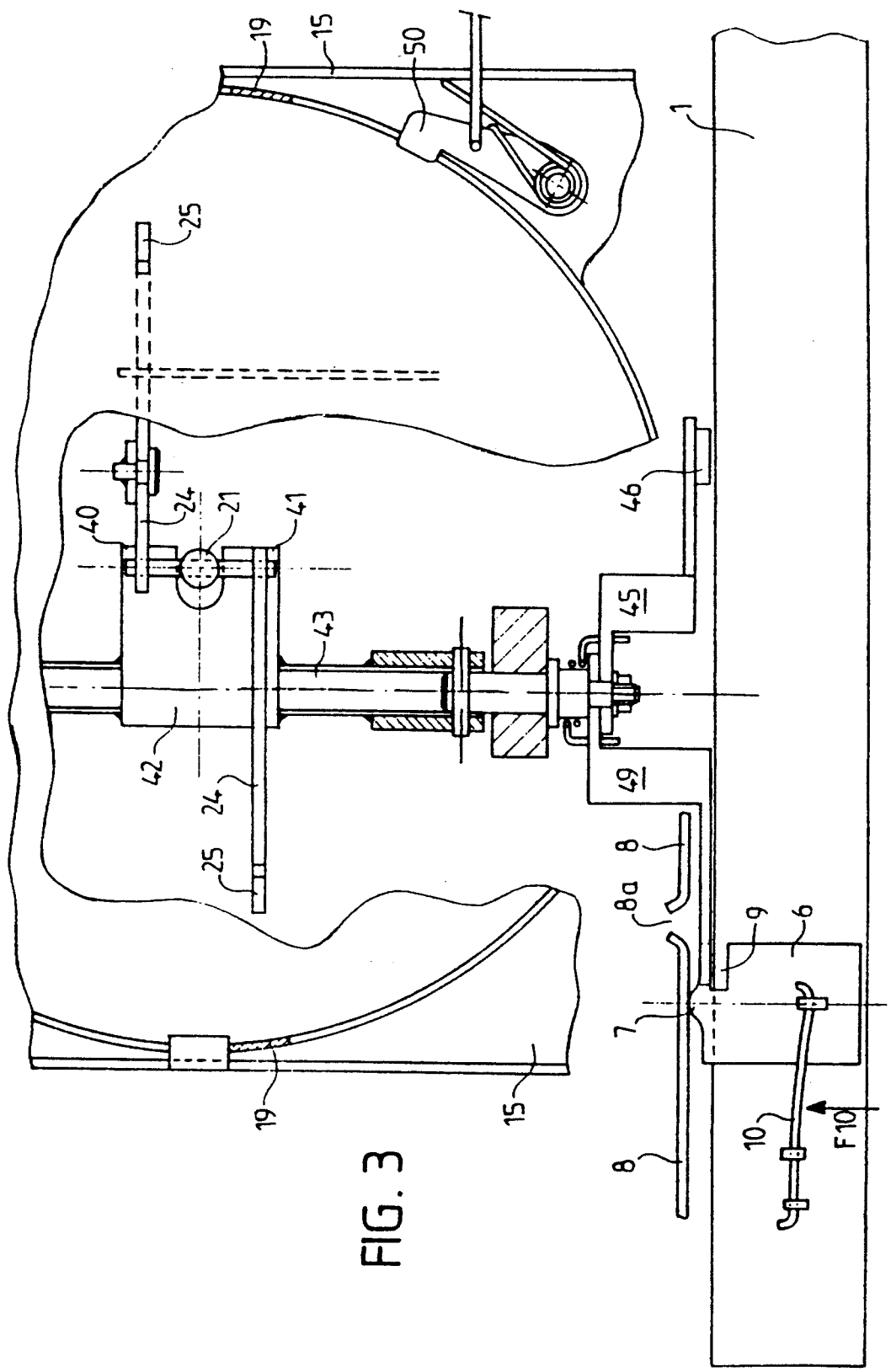
FIG. 3 is a top view of the rotary base mechanism, partly sectioned, with the rotary base in a locked position.
Figure 4:
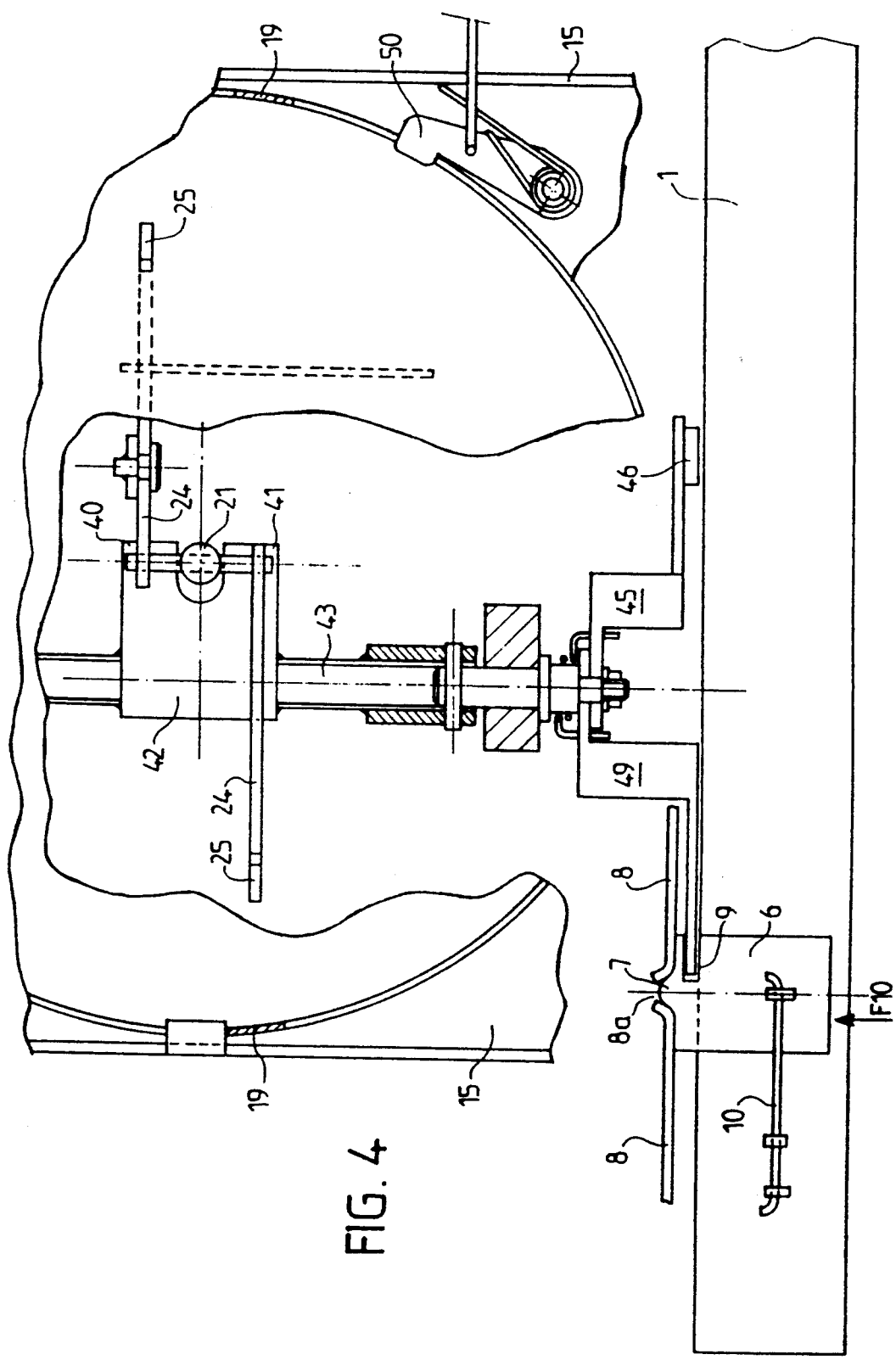
FIG. 4 is a view corresponding to FIG. 3 in a position just prior to the 180° rotation of the seat.
Figure 5:
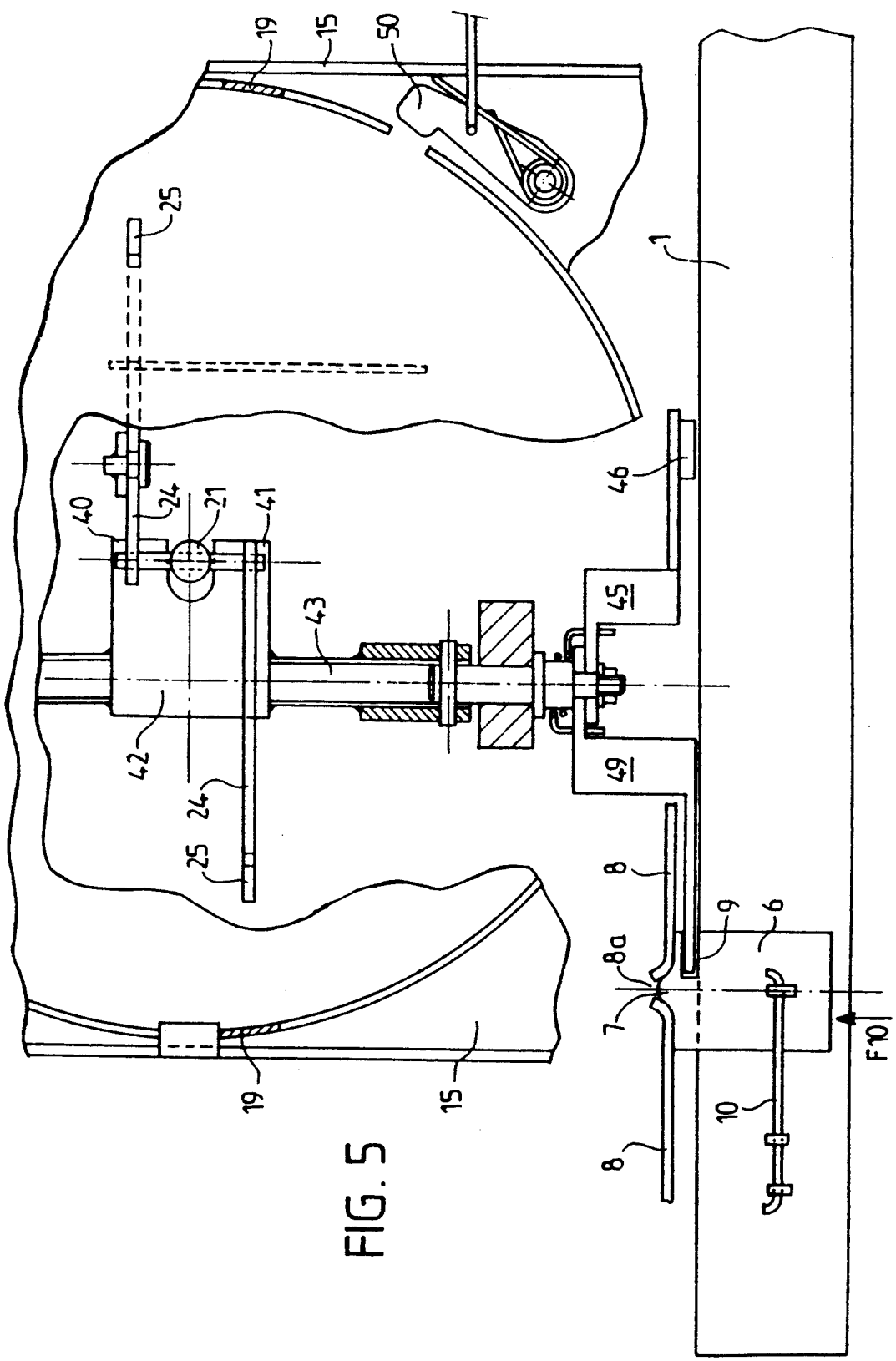
FIG. 5 is a view corresponding to FIGS. 3 and 4 at the moment of 180° rotation of the seat.

Finally, the vertical sliding rod 21 has, in its lower portion, a second pin 26a forming a lower abutment for the end portions 40 and 41 of a fork 42 (see FIGS. 3, 4, 5) fixedly mounted on a shaft 43 having, at each one of its ends, an essentially Z-shaped arm (when viewed from the top, namely, on one end, a first Z-shaped arm 45 ending in a reinforcement 46 cooperating with the rear end of the locking mechanism 11 and, on the other end, a second Z-shaped arm 49 which can be lowered into the recess 9 of the sliding latch 6, positioned on the top of the upper mobile profiled member 1 of each slide.

When it is desired to pivot the seat 17 mounted on this rotary base, the seat 17 is first, as shown in FIG. 2, moved towards the front of the vehicle by lifting the end 34a (FIG. 7) the rod 34. The rod 34 pivots about the pivot 35 and causes via the leg 31 of the forked end 33 a downward movement of the rod 21 and, therefore, a lowering of the pins 26 and 26a, thereby causing a rotary movement of the fork 42, of the shaft 43 and of the first Z-shaped arm 45, thus disengaging the upper mobile profiled member 1 from the fixed lower profiled member 2 of each slide, because the locking mechanisms 11 are lowered in direction of the arrow F12.

At a precisely determined point of the relative slide displacement the projection 7 of the sliding latch 6 is forced under action of the spring 10 into the opening 8a of the abutment 8.

The seat 17 is brought to this defined position by a sliding motion in direction of the arrow F15 (see FIGS. 2 and 7) of the upper mobile profiled members 1 of the slides.

At that moment, by a pivoting movement of the back portion 17a of the seat 17, a latching mechanism 50 (see FIGS. 3, 4 and 5) is disengaged from the cover 19, thereby releasing the rotary intermediate plate 15. When the latching mechanism 50 is in the position shown in FIG. 5, the lever 34 is then lowered in direction of the arrow F2 (see FIG. 7). The effect of this movement is the lifting of the sliding rod 21 under action of the forked end 33, thereby causing, via the pin 26a, a release of the vertical latching fingers 25 from the holes 26 formed in the cover 19, the fixed plate 13 and the inner edge of the rotary intermediate plate 15, thereby releasing the rotary intermediate plate 15. At this moment, it is possible to carry out a 180° rotation of the seat 17. This operation is made possible by the arm 49 engaging the recess 9 of the sliding latch 6.

When returning the back portion 17a of the seat 17, the latching mechanism 50 resumes its position in which the latching mechanism 50 locks the rotary intermediate plate 15.

The only thing left to do then is to return the seat 17 back to the required position by a sliding movement of the upper mobile profiled members initiated 1 by lifting the rod 34 (arrow F1, FIG. 7).

It should however be noted that when an awkward action is carried out with respect to the rod 34, for example in direction of the arrow F2 (see FIG. 7) and the sliding latch 6 is not locked in the opening 8a, the only effect will be the compression of the spring 29 without permitting a displacement of the sliding rod 21.

The present invention is, of course, in no way restricted to the specific disclosure of the specification and drawings, but also encompasses any modifications within the scope of the appended claims.

What I claim is:

1. A safety rotary base for a vehicle seat, allowing a 180° rotation of the seat, said rotary base comprising:
   longitudinal adjusting slides each comprised of an upper mobile profiled member and a lower fixed profiled member, said upper mobile profiled member slidable on said lower profiled fixed member;
   a fixed plate connected to said slides comprising a first ball bearing;
   a cover comprising a second ball bearing, said cover fixedly connected to said fixed plate;
   a rotary intermediate plate, connected between said fixed plate and said cover via said first and said second ball bearings so as to be rotatable relative to said fixed plate and said cover, said fixed plate, said rotary intermediate plate, and said cover centered by said first and said second ball bearings;
   a rod centrally penetrating said fixed plate, said rotary intermediate plate, and said cover, said rod being slidably connected to said fixed plate, said rotary intermediate plate, and said cover, with said rod having a head;
   a washer slidably connected to said rod near said head;
   a spring concentrically positioned about said rod and connected between said head and said washer for biasing in a downward direction said washer;
   a lever pivotably supported at said fixed plate, said lever having a forked end, said forked end having a first leg resting on said head and a second leg resting on a downward side of said washer;
   a first and a second arm connected remote from said head to said rod in pivotable manner;

a locking mechanism for locking said upper mobile profiled member relative to said lower fixed profiled member, said locking mechanism released upon actuation of said lever in a first direction of movement resulting in a downward movement of said rod and a downward pivoting of said first arm so that said first arm releases said locking mechanism;

two safety latches locking said rotary intermediate plate against rotation, said forked end of said lever actuating in a second direction of movement opposite to said first direction of movement said safety latches for releasing said rotary intermediate plate only after first releasing said locking mechanism and pushing the vehicle seat forward; and a latching mechanism locking said rotary intermediate plate against rotation, said latching mechanism released by tilting a back portion of the vehicle seat toward a sitting portion of the vehicle seat.

2. A safety rotary base according to claim 1, further comprising:

a sliding latch connected to said upper mobile profiled member for controlling the release of said upper mobile profiled member relative to said lower fixed profiled member by said first arm, said sliding latch having a projection and a recess; and an abutment, extending in the longitudinal direction of said slides, with an opening, said projection engaging said opening at a predetermined position in which rotation of the vehicle seat is permitted, and said second arm engaging said recess in said predetermined position to ensure a safe operation of said rotary base.

* * * * *